United States Patent
Thompson et al.

(10) Patent No.: US 9,651,728 B2
(45) Date of Patent: May 16, 2017

(54) VARIABLE INDEX LIGHT EXTRACTION LAYER WITH MICROREPLICATED POSTS AND METHODS OF MAKING THE SAME

(71) Applicant: 3M INNOVATIVE PROPERTIES COMPANY, St. Paul, MN (US)

(72) Inventors: David S. Thompson, West Lakeland, MN (US); Vivian W. Jones, Woodbury, MN (US); Michael A. Meis, Stillwater, MN (US); Mikhail L. Pekurovsky, Bloomington, MN (US); Kevin R. Schaffer, Woodbury, MN (US); Audrey A. Sherman, Woodbury, MN (US); Steven D. Solomonson, Shoreview, MN (US); Matthew S. Stay, Minneapolis, MN (US); Joseph W. Woody, V, Saint Paul, MN (US); Zhaohui Yang, North Oaks, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 183 days.

(21) Appl. No.: 14/405,322

(22) PCT Filed: May 23, 2013

(86) PCT No.: PCT/US2013/042489
§ 371 (c)(1),
(2) Date: Dec. 3, 2014

(87) PCT Pub. No.: WO2013/184385
PCT Pub. Date: Dec. 12, 2013

(65) Prior Publication Data
US 2015/0131297 A1    May 14, 2015

Related U.S. Application Data

(60) Provisional application No. 61/655,208, filed on Jun. 4, 2012.

(51) Int. Cl.
*F21V 8/00* (2006.01)
*B29D 11/00* (2006.01)

(52) U.S. Cl.
CPC ...... *G02B 6/0036* (2013.01); *B29D 11/00682* (2013.01); *G02B 6/0053* (2013.01); *G02B 6/006* (2013.01); *G02B 6/0061* (2013.01)

(58) Field of Classification Search
CPC .... G02B 6/0036; G02B 6/0053; G02B 6/006; G02B 6/0061; B29D 11/00682
See application file for complete search history.

(56) References Cited

U.S. PATENT DOCUMENTS

| 5,396,350 A | 3/1995 | Beeson |
| 6,425,675 B2 | 7/2002 | Onishi |

(Continued)

FOREIGN PATENT DOCUMENTS

| EP | 1992869 | 11/2008 |
| WO | WO 97-36131 | 10/1997 |

(Continued)

OTHER PUBLICATIONS

International Search Report for PCT International Application No. PCT/US2013/042489 mailed on Aug. 12, 2013, 5 pages.

*Primary Examiner* — Mary Ellen Bowman
(74) *Attorney, Agent, or Firm* — Daniel J. Iden

(57) ABSTRACT

Variable index light extraction layers (100) that contain a plurality of microreplicated posts (120) are described. The variable index light extraction layers contain a plurality of microreplicated posts (120), a first region including a first lower-index substance (130) and a second region including a second higher-index substance (140). Optical films can use the variable index light extraction layers (100) in front lit or back lit display devices.

20 Claims, 7 Drawing Sheets

(56) References Cited

U.S. PATENT DOCUMENTS

| | | | |
|---|---|---|---|
| 6,480,307 B1 | 11/2002 | Yang | |
| 7,442,964 B2 * | 10/2008 | Wierer, Jr. | B82Y 20/00 257/432 |
| 7,521,854 B2 * | 4/2009 | Erchak | H01L 33/20 257/10 |
| 8,827,532 B2 | 9/2014 | Wang | |
| 2006/0204865 A1 * | 9/2006 | Erchak | H01L 33/20 430/7 |
| 2007/0058391 A1 | 3/2007 | Wilson | |
| 2007/0252923 A1 | 11/2007 | Hwang | |
| 2009/0015757 A1 * | 1/2009 | Potts | B82Y 20/00 349/69 |
| 2009/0026924 A1 * | 1/2009 | Leung | C09D 183/02 313/504 |
| 2009/0091949 A1 | 4/2009 | Lee | |
| 2010/0067257 A1 | 3/2010 | Meis | |
| 2011/0123800 A1 | 5/2011 | Sherman | |

FOREIGN PATENT DOCUMENTS

| | | |
|---|---|---|
| WO | WO 2009-017794 | 2/2009 |
| WO | WO 2011-005889 | 1/2011 |
| WO | WO 2011-088161 | 7/2011 |
| WO | WO 2012-116129 | 8/2012 |
| WO | WO 2012-116199 | 8/2012 |
| WO | WO 2012-116215 | 8/2012 |
| WO | WO 2012-158414 | 11/2012 |
| WO | WO 2013-043827 | 3/2013 |

* cited by examiner

VARIABLE INDEX LIGHT EXTRACTION LAYER WITH MICROREPLICATED POSTS AND METHODS OF MAKING THE SAME

BACKGROUND

Light extraction layers are useful in a variety of optical stacks, for example, in displays, general illumination, or other lighting applications. In many of these applications, the light extraction layer may be optically coupled to a lightguide, where the light extraction layer operates to selectively extract light of a particular range of angles from the lightguide. In traditional lightguides, extraction layers have light scattering features in order for light being transported within the lightguide to be directed out of the lightguide. These light scattering features sometimes include diffusely reflective printed extraction dots or structures disposed on or etched into the surface of the lightguide. Unfortunately, many of these layers are either not optically transparent or not significantly non-distorting, making viewing difficult.

SUMMARY

In one aspect, the present disclosure describes a variable index light extraction layer. In some embodiments, the variable index light extraction layer includes a plurality of microreplicated posts. The variable index light extraction layer includes a first region, including a first substance and at least a portion of the plurality of microreplicated posts, and a second region, including a second substance. From a plan view, the first and the second regions do not overlap. The first region has a lower effective index of refraction than the second region. The first region, second region, and the plurality of microreplicated posts together form a continuous layer.

In another aspect, the present disclosure describes an optical film. The optical film includes a variable index light extraction layer which includes a plurality of microreplicated posts. The variable index light extraction layer includes a first region, including a first substance and at least a portion of the plurality of microreplicated posts, and a second region, including a second substance. From a plan view, the first and the second regions do not overlap. The first region also has a lower effective index of refraction than the second region. The optical film also includes a substrate layer and a sealing layer. The sealing layer is optically coupled to a first major surface of the variable index light extraction layer, and the substrate layer is optically coupled to a second major surface of the variable index light extraction layer opposite the sealing layer.

In yet another aspect, the present disclosure describes a method of forming a variable index light extraction layer, in which the method includes a first step of microreplicating a plurality of posts on a substrate and a second step of selectively applying a substance on the substrate. A first region includes at least a portion of the plurality of posts and portions of an area between the posts not filled by the substance. A second region includes portions of the area between the posts filled by the substance. The first region has a lower effective index of refraction than the second region.

In another aspect, the present disclosure describes a method of forming a variable index light extraction layer. The method includes microreplicating a plurality of posts on a substrate, forming a pattern including spaces between the posts; selectively forming a blocking layer on an adhesive of a sealing layer; and attaching the sealing layer to the substrate such that the blocking layer prevents penetration of the adhesive into one or more of the spaces between the posts, where a first region includes one or more spaces between posts with no adhesive penetration and a second region includes the spaces at least partially filled by the adhesive of the sealing layer.

DETAILED DESCRIPTION

Embodiments of the present disclosure include a variable index light extraction layer that may generally include a plurality of microreplicated posts and includes at least two regions. The first region includes a first substance (which may include air) and at least a portion of the microreplicated posts and the second region includes a second substance. The first substance and the second substance have different characteristics, for example, the first substance may have a lower index of refraction than the second substance. Because the regions of high-index optical properties and low-index optical properties may vary across the optical layer, the optical layer may be referred to as a variable index optical layer. Throughout this disclosure, the term "index" is often used in place of index of refraction or refractive index.

In some embodiments, the variable index light extraction layer may be optically coupled to one or more lightguides. In other exemplary embodiments, the variable index light extraction layer may be further optically coupled to a reflective scattering element such as a film or reflective display. In reflective display embodiments, it is an advantage of embodiments of the present invention that a viewer looking through the variable index light extraction layer would be able to view the pixels of the display (or image) without significant haze or distortion. In addition to optical benefits, variable index light extraction layers of the present disclosure may be produced by relatively simple coating and printing techniques amenable to high speed and low cost manufacturing.

In general, variable index light extraction layers of the present disclosure include at least two different areas or regions, The variable index light extraction layer can be used in a variety of optical film constructions, assemblies, and devices as described herein.

The variable index light extraction layer may act to extract light traveling in an adjacent layer at otherwise supercritical angles, while at the same time scattering little to no light for subcritical light incident on the extraction layer. The variable index light extraction layer may illuminate an article or other display element by extracting light from an adjacent layer. In some embodiments, the variable index light extraction layer does not have features that significantly or functionally scatter light, thereby providing little distortion to images and objects on the opposite side. The variable light extraction layer may be transparent, that is, exhibiting little to no haze and high clarity, both with and without illumination. This allows for viewing of images on a reflective display or of a graphic without significant reduction in resolution or contrast, and without visible optical artifacts generated by light scattered or diffracted by different regions.

Figure 1A:
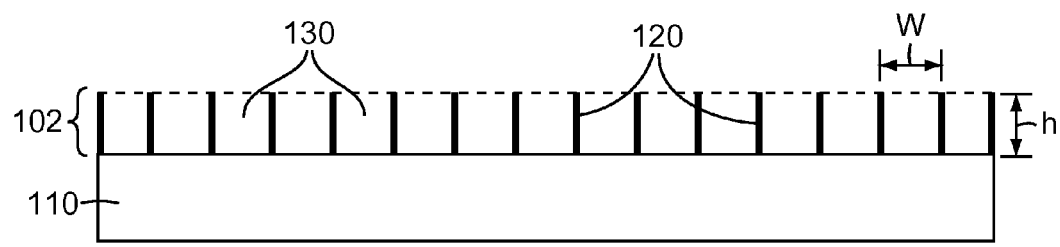
FIG. 1A is a cross-sectional elevation view of a low-index layer.

FIG. 1A is a cross-sectional elevational view of a low-index layer which forms the basis for some embodiments of the variable index light extraction layer, discussed in greater detail below. Low-index layer 102 includes microreplicated posts 120 and air 130, and is formed on substrate 110.

Microreplicated posts 120 can be created from any suitable material and through any suitable process. In some embodiments, microreplicated posts 120 are formed of a polymer, such as homopolymers or copolymers of polyethylene terephthalate (PET) and polyethylene naphthalate (PEN), acrylic, polycarbonate, cyclo-olefin polymers, silicones, and other transparent materials. Microreplicated posts can also be formed from a suitable resin, coating, ink, adhesive or other substance, for example one that is curable with light in the ultraviolet or visible portion of the electromagnetic spectrum, curable thermal means or by other forms of radiation. In some embodiments, microreplicated posts 120 may include a nanoporous material, including a nanovoided polymeric material described, for example in U.S. Patent Application Ser. No. 61/446,740, entitled "Front-Lit Reflective Display Device and Method of Front-Lighting Reflective Display," and filed Feb. 25, 2011. The posts may be formed by processes such as stamping, embossing, extrusion replication or through a cast and cure method, where a suitable material is cast against a substrate or tool, cured with, for example, ultraviolet light, and removed. Any suitable process can be used to leave imprints that form the microreplicated posts 120. In some embodiments, microreplicated posts may be formed on or from substrate 110.

Depending on the desired optical and structural properties, the series of microreplicated posts 120 can have any suitable pitch and each microreplicated post can have any suitable width. The pitch and width may remain constant in a planar direction or it may vary. The variation can be a gradient or it can be substantially random. In some embodiments, the pitch or width can increase and decrease over a planar dimension. The height of microreplicated posts 120 may also be constant or vary. In practice, the height of microreplicated posts 120 should be at least 100 nm to avoid undesired evanescent wave coupling. Further, the width of each microreplicated post may be selected to be suitably rigid or durable—that is, to withstand manufacturing, handling, printing, or filling without substantial damage, breaking or bending.

Useful patterns of replicated features for the low-index layer 102 may include one-dimensional features such as a series of replicated lines, two-dimensional features such as an array of posts, or mixtures of both one-dimensional and two-dimensional features (for example, a grid or honeycomb-like structure where multiple replicated lines create a two-dimensional replicated pattern)

Substrate 110 may be formed from any suitable material. In some embodiments, substrate 110 may be the same material or even part of the same contiguous piece of material as the variable index light extraction layer 102. In other embodiments, substrate 110 may be attached to the variable index light extraction layer, either before or after the formation of the microreplicated posts 120. In some cases the substrate 110 may be a material suitable for use as a lightguide. In other cases the substrate 110 may comprise a reflective scattering material.

While the substrate 110 is shown as substantially flat (planar) and of a constant thickness, the substrate can be of any suitable shape and with any suitable thickness profile. Substrate 110 may be substantially curved, planar, or contain regions of each. The shape of the substrate may be optimized to be more easily incorporated into certain lighting applications, such as luminaires. In some embodiments, the thickness of the substrate 110 may be selected to promote dimensional stability, or it may be chosen to resist certain defects that may arise in processing or in use, such as warping. The substrate may be optically transparent, may be a transmissive scattering element for example a diffuser or it can impart or filter a desired optical characteristic of incoming light, such as haze or color or the substrate may be a reflective scattering element.

The dimensions of the spaces between the microreplicated posts 120 can have the same dimensions—height h and width W—throughout the variable index light extraction layer 102, or the dimensions of the areas can vary. The variation of the dimensions of the areas, if any, may be a random variation or it may be a gradient depending on the application. In some embodiments, the width W may be constant; in others, the height h may be constant. Other embodiments may have both h and W or neither h nor W remain constant.

For a low-index layer where a portion is microreplicated posts (having an index of refraction greater than 1), and a second portion is air, there is an effective index of refraction between the two indices of refraction, at least for certain wavelengths of light. Generally, when the wavelength of light is much greater than the size of the microreplicated posts in the the low-index region, the light behaves as if it were incident on a material having a single effective refractive index that is determined by the refractive indices of the air, $n_{air}$, the resin, $n_{resin}$, and by the volume fraction of air, f, where the effective index is expressed by the following expression:

$$n_{eff} = fn_{air} + (1-f)n_{resin}$$

The size of the portions can be calibrated or selected to be a size that is less than ½ the wavelength region of interest, less than ⅓ the wavelength region of interest, less than ¼ the wavelength region of interest, or less than ⅕ the wavelength region of interest. The intermediate or effective refractive index is dependent on the indices of refraction of the two portions and the ratio between their linear extent or volume fraction. In some cases, for instance where the microreplicated posts 120 are normal to the substrate 110, the linear extent of a portion is equal to its volume fraction. For example, if a certain region's linear extent is half microreplicated posts and half air, it will have a higher effective refractive index than another region that has a linear extent made of 10% microreplicated posts and 90% air. Correspondingly, different ratios of microreplicated posts vis-à-vis air fractions will give different effective refractive indices, and these ratios may be tuned to provide suitable effective refractive indices, in some embodiments less than 1.4, less than 1.35, less than 1.30, less than 1.25, less than 1.2 or less than 1.15.

Figure 1B:
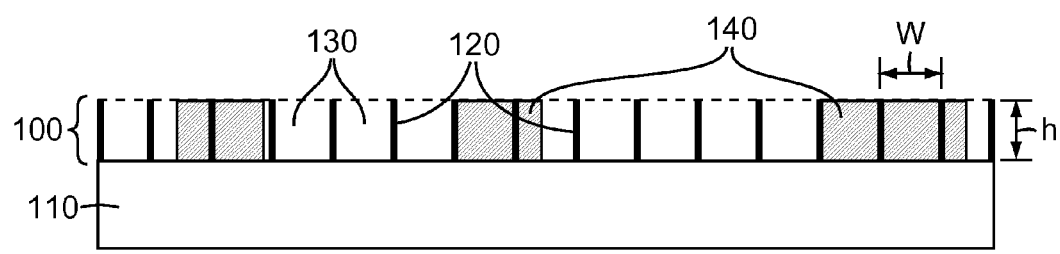
FIG. 1B is a cross-sectional elevation view of a variable index light extraction layer.

FIG. 1B is a cross-sectional elevation view of a variable index light extraction layer. Variable index light extraction layer 100 is based on the low-index layer 102 depicted in FIG. 1A, but includes optical material 140 in addition to microreplicated posts 120, air 130, and substrate 110.

Optical material 140 may be a high refractive index ink, adhesive, or other suitable material, including pressure sensitive adhesives and hot melt adhesives. In some embodiments, the index of refraction of the optical material 140 is in the refractive index range of 1.4 to 2.1 and may be at least 1.4, 1.45, 1.5, at least 1.6, or at least 1.7. Suitable indices of refraction for the optical material 140 may depend on the width and pitch of microreplicated posts 120, the proportion—both in size and numerousness—of filled areas to unfilled areas, and the desired light extraction properties of the variable index light extraction layer 100. Further, the index of refraction of the optical material 140 may be selected to be similar to or greater than that of an adjacent layer or layers (to extract light or prevent total internal reflection). In some embodiments, optical material 140 may be transparent. Optical material 140 may also be selected for its viscosity, ease of integration into manufacturing processes (e.g., ability to be printed or quickly injected) or temperature tolerance.

Applying optical material 140 to the variable index light extraction layer 100 may use any suitable application or printing process, including an indirect gravure printing process, flexographic printing, or any other printing process, for example, ink jet printing or valve jet printing. In some embodiments, optical material 140 may be applied to a sealing layer (described below) and applied to certain regions of the variable index light extraction layer 100 when attached.

Figure 1C:
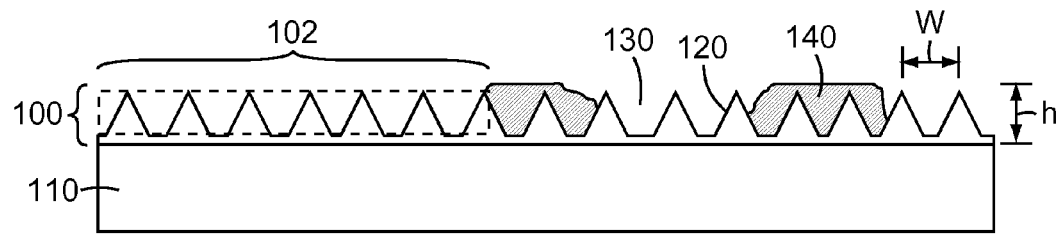
FIG. 1C is a cross-sectional elevation view of another variable index light extraction layer.

FIG. 1C is a cross-sectional elevation view of another variable index light extraction layer. Low-index layer 102 which forms the basis for variable index light extraction layer 100 includes microreplicated posts 120 air 130, and may be formed on substrate 110. Variable index light extraction layer also includes optical material 140.

This figure illustrates one of the variety of shapes and configurations of microreplicated posts 120 that may be suitable for low-index layer 102 or variable index light extraction layer 100. Suitable shapes for microreplicated posts 120 include but are not limited to cylinders, lenslets, cones, spheres, conic sections, triangular and rectangular prisms, or any combination thereof. The microreplicated posts may also be the inverse of any shape, that is, the negative space created by microreplicated posts 120 may be any of the above shapes. Microreplicated posts 120 may sometimes be formed so there is no point where air 130 or optical material 140 is in direct contact with substrate 110, as shown in FIG. 1C. In such cases, low-index layer 102 may include only a portion of the height of microreplicated posts 120, as depicted in FIG. 1C. In other words, the dimensions of low-index layer 102 need not extend all the way to substrate 110. In some embodiments, as shown in FIG. 1C, the effective index of refraction may be difficult to measure and may be different for each side of the layer. In some cases, a top portion of low-index layer 102 may have an effective index of refraction less than the index of refraction of optical material 140, while a bottom portion may not. It should be apparent to one with skill in the art that low-index layer 102 may be considered a low-index layer and may still function as such even if only a portion of low-index layer 102 has a sufficiently low effective index of refraction.

Further, optical material 140 need not be perfectly filled or printed in variable index light extraction layer 100. As shown in FIG. 1C, optical material 140 may be over- or under-filled, and may include areas of "slumping" material. This may be either an artifact of the manufacturing process or of flow properties of the optical material itself.

For the ease of explanation and illustration, other figures in this application show thin, cylindrical microreplicated posts and depict optical material 140 as having sharp, vertical edges. It will be apparent to one having skill in the art that the imperfections in FIG. 1C may have a negligible or nonexistent effect on variable index light extraction layers described in this application, and that changes in the shape or configuration of microreplicated posts 120 or deviations in the sharp edges of optical material 140 likely have no appreciable effect on the function, description, method of making, or manner of using the variable index light extraction layers described herein.

Figure 2:
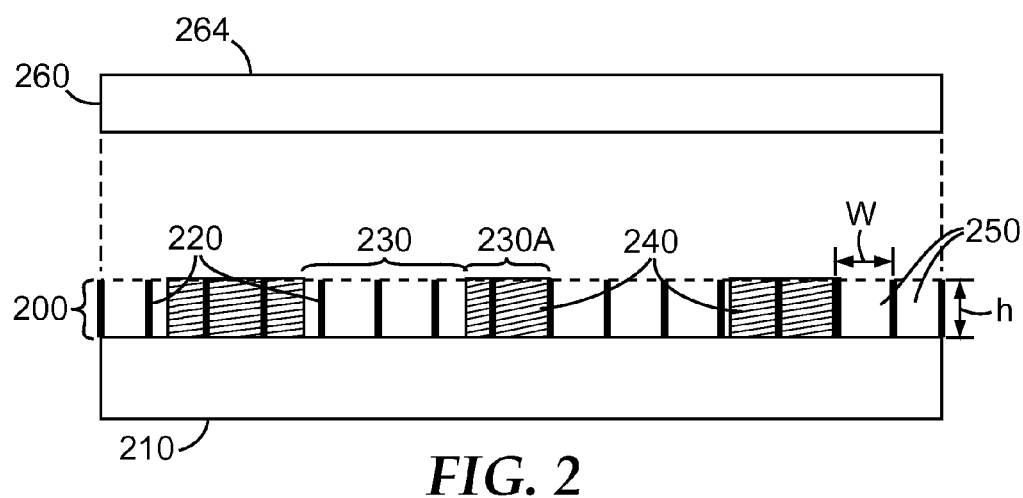
FIG. 2 is an exploded cross-sectional elevation view of a film including a variable index light extraction layer.

FIG. 2 is an exploded cross-sectional view of a film including an embodiment of a variable index light extraction layer of FIG. 1B. Variable index light extraction layer 200 is formed on a substrate 210. Variable index light extraction layer 200 includes microreplicated posts 220 and includes optical material 240 and air 250. Area 230 is a first region which includes air 250 and some microreplicated posts 220. Area 230A is a second region containing optical material 240.

Area 230A should be at least partially filled with an optical material 240. The optical material 240 should distinguish the optical properties of the filled areas 230A from the unfilled areas 230. For example, the optical material 240 may have a different index of refraction than the microreplicated posts 220 and the air 250. In some embodiments, the refractive index of optical material 240 may be greater than the effective index of area 230. Optical material 240 may fill any amount of the space between microreplicated posts 220, represented by width W. In areas 230A, optical material 240 may fill the full width W between microreplicated posts 220 or it may fill only part of the width W between microreplicated posts 220. Likewise, in areas 230A, optical material 240 may be completely filled to a height of h or it may be only partially filled or overfilled. The distribution and amount of optical filling 240 in areas 230A may be altered or selected for optical, processing, or material cost considerations. Areas 230 and 230A may be shaped and arranged to yield a layer with high clarity, low haze and high transmission when the layer is physically attached and optically coupled to a lightguide, reflective scattering element or reflective display.

In some embodiments, sealing layer 260 is optically coupled to variable index light extraction layer 200. In some cases sealing layer 260 may be attached or otherwise disposed near the open side of the variable index light extraction layer 200 opposite substrate 210. The sealing layer 260 may be made of any suitable polymer or other material. Additionally, the sealing layer may help protect the optical properties of the variable index light extraction layer 200, including protecting the areas 230 and 230A from dirt or dust and the microreplicated posts 220 from bending or breaking. The sealing layer 260 may also be selected to impart different properties to the film as a whole, including dimensional stability, warp resistance, or to make the film more easily attachable to further components. Further, though the sealing layer 260 is shown in FIG. 2 to be substantially planar, the sealing layer may take any suitable shape, including curved and textured.

The sealing layer 260 may be attached to the variable index light extraction layer 200 by an adhesive. In some embodiments, the adhesive may be optically transparent, thereby preserving the non-distorting characteristics of the variable index light extraction layer. The adhesive may be a pressure-sensitive adhesive for ease in attachment or it may be selected to minimize microvoiding during further processing or in its use in suitable applications. In other embodiments the adhesive may be an optical ink or structural adhesive that when attached to the sealing layer 260 and subsequently cured bonds the sealing layer 260 to the variable index light extraction layer 200. In some embodiments, the optical adhesive for bonding the sealing layer to the variable index light extraction layer is the additional material 240 with defines the second high index region of the variable index light extraction layer. In some embodiments, the adhesive itself may be used as the sealing layer 260. This may be useful in applications where greater flexibility is desired, or in applications where the film including the variable index light extraction layer 200 is laminated or attached to other optical or non-optical layers or components.

Sealing layer 260 includes a major surface, output surface 264, that may also serve as the output surface for the film. In some embodiments, surface 264 of the sealing layer 260 may be textured or microstructured to impart desired optical properties, such as antiglare or light turning functionality. In some embodiments, a viewer may observe output light through output surface 264.

Figure 3:
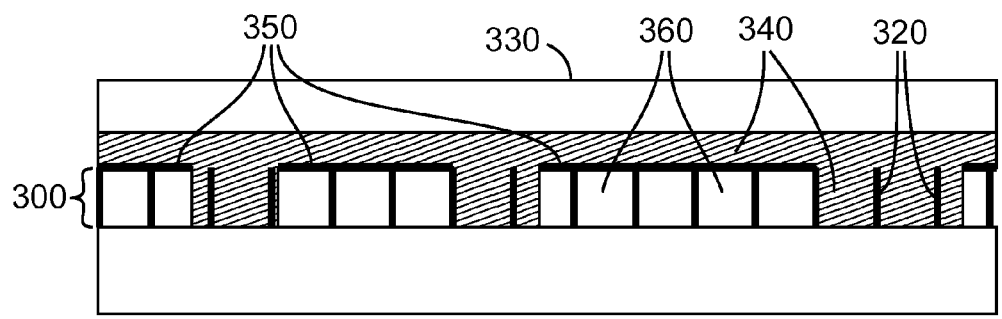
FIG. 3 is a cross-sectional elevation view of another film including a variable index light extraction layer.

FIG. 3 shows an alternative construction of a film including a variable index light extraction layer of FIG. 1B. Variable index light extraction layer 300 includes, like variable index light extraction layer 200 of FIG. 2, microreplicated posts 320 and air 360.

Sealing layer 330 includes adhesive 340 and blocking layer 350. Blocking layer 350 may be selectively printed, applied, or attached to adhesive 340 and may be any suitable material. In some embodiments, blocking layer 350 may be a non-adhesive ink. Suitable materials and methods for applying a blocking layer are described, for example, in U.S. Patent Application Ser. No. 61/538,511, entitled "Retroreflective Articles Including a Security Mark," and filed Sep. 23, 2011. Blocking layer 350 may be applied in any suitable pattern or gradient, or may be applied randomly or pseudo-randomly. When sealing layer 330 is attached to variable index light extraction layer 300, adhesive 340 may penetrate areas between microreplicated posts 320 in the regions where there is no blocking layer 350. Adhesive 340 may either be able to flow at ambient processing temperature, and thereby penetrate areas between microreplicated posts 320 that in the regions where there is no blocking layer 350 simply by attaching sealing layer 330 to variable index light extraction layer 300, or adhesive 340 may require an extra processing step of heating (after attaching) before it may flow (for example, a hot melt adhesive) and penetrate said regions. The regions penetrated and filled create second high index regions of the variable index light extraction layer. The blocking layer, which may be disposed between microreplicated posts 320 and adhesive 340, may selectively prevent adhesive 340 from filling the area between certain microreplicated posts 320 or otherwise seal those areas, preserving regions filled with air 360, thus creating the variable index light extraction layer with first low index regions.

The final appearance and optical performance of variable index light extraction layer 300 may vary depending on the flow characteristics and viscosity of the material selected as adhesive 340. Adhesive 340 may flow and fill spaces between microreplicated posts 320 that are partially or fully blocked by blocking layer 350. In other embodiments, adhesive 340 may only flow incompletely or partially into the spaces between microreplicated posts 320. Suitable optical adhesives for use with the process described herein can be either viscoelastic adhesive, for example, pressure sensitive adhesive or hot melt adhesives. Suitable adhesives for laminating adhesives and lightguide adhesives are described in, for example, U.S. Patent Application Ser. No. 61/446,740, entitled "Front-Lit Reflective Display Device and Method of Front-Lighting Reflective Display," and filed Feb. 25, 2011.

Figure 4:
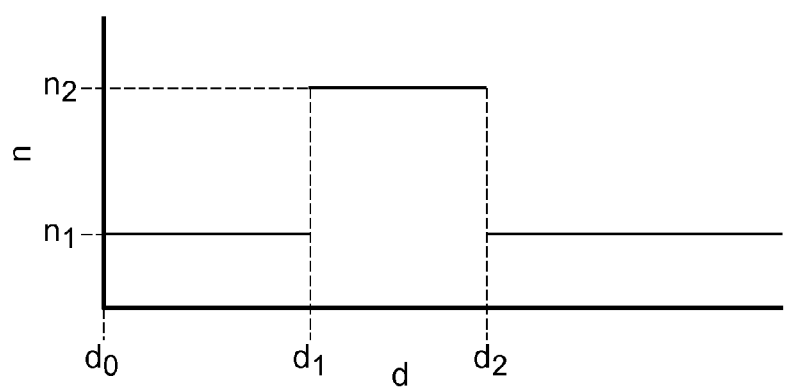
FIG. 4 is a diagram illustrating a relationship between location on the variable index light extraction layer of FIG. 1B and refractive index.

In general, the refractive index profile of the variable index light extraction layer may vary in any way, as long as the desired optical performance of the layer is obtained. FIG. 4 illustrates a relationship between location on the variable index light extraction layer of FIG. 1B and refractive index. The refractive index profile shows a plot of distance d, which corresponds to a distance across a transverse plane of the layer, for the layer in plan view. FIG. 4 shows that at some initial position on the layer corresponding to $d_0$, the layer has first refractive index $n_1$ corresponding to the first region. Moving across the transverse plane of the layer, first refractive index $n_1$ is observed until reaching $d_1$ where the refractive index of the layer increases to $n_2$ which corresponds to the second refractive index of the second region. Continuing to move across the transverse plane of the layer, the second refractive index $n_2$ is observed until reaching d2 where the refractive index of the layer decreases to $n_1$ indicating a second first region. The change in refractive index between two adjacent first and second regions having low and high indices, respectively, can vary in a number of ways. For example, the change in refractive index can be abrupt, as in a step function, between two adjacent regions. For another example, the change in refractive index can be monotonic, with the refractive index continuously increasing or decreasing (depending on whether the change is observed as a function of moving from the first region to the second region, or the second region to the first region, respectively). In some cases, the first and second refractive indices of the adjacent first and second regions vary as some combination of step and monotonic functions. In many cases, the transition region between the first and second regions is of negligible optical importance, taking into account the relative scale of the transition region versus the entire variable index light extraction layer.

Figure 5:
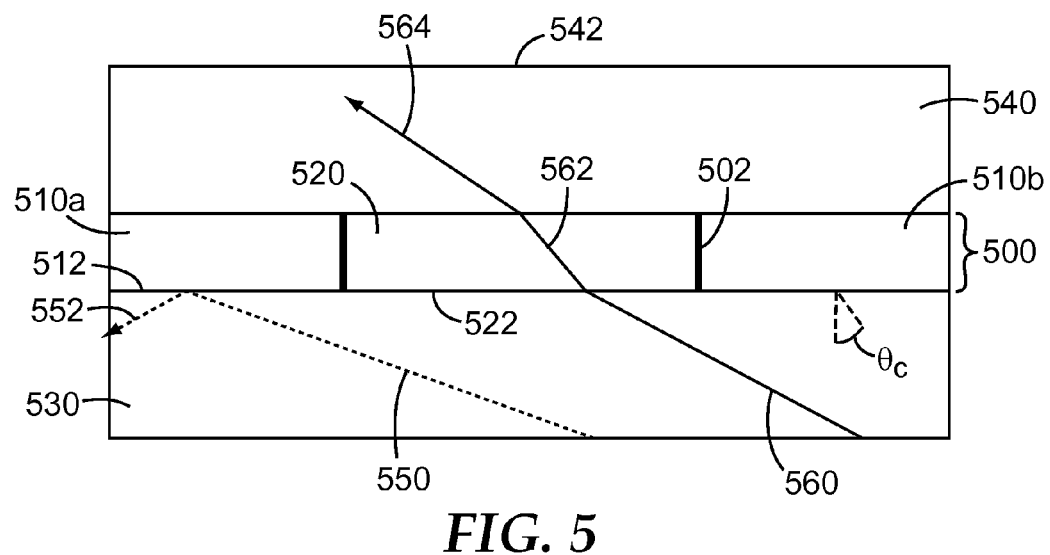
FIG. 5 is a cross-sectional view of a portion of the film including a variable index light extraction layer of FIG. 2.

The general optical functions of the variable index light extraction layer are shown in the cross-sectional view of FIG. 5, where a variable index light extraction layer 500 corresponds with layer 100.

Variable index light extraction layer 500 includes microreplicated posts 502 which separate low-index areas 510a and 510b and high-index area 520. Low-index areas 510a and 510b are substantially filled with air, while high-index area 520 is substantially filled with a material having a high index of refraction, possibly greater than 1.4, 1.5, 1.6, or 1.7. On a first major surface, variable index light extraction layer 500 is bordered by substrate layer 530 which is a lightguide, forming interfaces 512 and 522. In practice, high-index area 520 of the variable index light extraction layer 520 may have a refractive index similar to or greater than the substrate 530. Sealing layer 540 is attached on a second major surface of variable index light extraction layer 500. Sealing layer 540 includes an output surface 542 through which light may reach a viewer.

The difference in refractive indices between the substrate layer 530 and the air-filled low-index areas 510a and 510b defines a critical angle $\theta_c$ via Snell's law, for which supercritical (i.e., of an angle of incidence greater than the critical angle) light undergoes total internal reflection (TIR). Air has a refractive index of about 1, and it may be assumed that any polymer will have an index of refraction greater than 1.

For example, first light ray 550, propagating in substrate layer 530, is incident on the variable index light extraction layer 500 at substrate/air interface 512 at a supercritical angle. The ray is reflected through TIR and remains in the substrate 530 as reflected TIR ray 552.

In contrast, second light ray 560, propagating in substrate layer 530, is incident on the variable index light extraction layer 500 at the substrate/high-index interface 522 and second light ray 560 is refracted as it passes from substrate 530 to high-index area 520 as refracted ray 562. Refracted ray 562 is refracted again as extracted ray 564 when it passes into the sealing layer having a lower index of refraction than high-index area 520. Extracted ray 564 may be then transmitted through the output surface 542 and observed by a viewer.

FIG. 5 is only illustrative of the general operational principles of a film containing a variable index light extraction layer. For example, though not shown, light rays incident on the variable index light extraction layer 500 from the other side (i.e., from sealing layer 540) may also undergo TIR when at supercritical angles. Likewise, an otherwise extracted ray may undergo TIR when supercritically incident on the interface of the low-index areas 510a or 510b.

Figure 6:
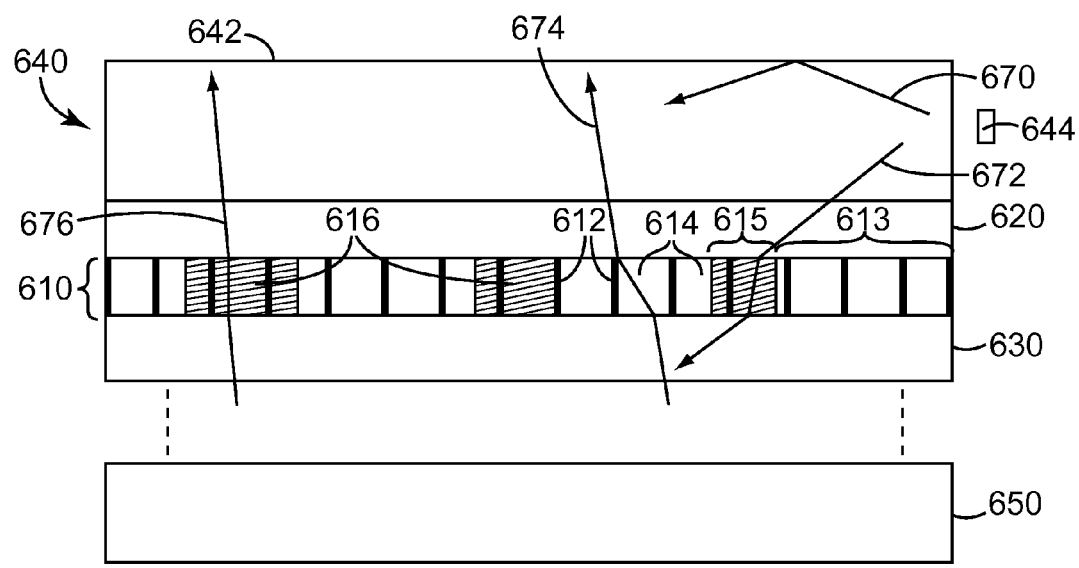
FIG. 6 is a cross-sectional view of a frontlight for a reflective display using the film including a extraction layer of FIG. 2.

FIG. 6 is an exploded cross-sectional diagram of a frontlight for a reflective display using a variable index light extraction layer 610, corresponding to variable index light extraction layers 100 or 200, showing in FIG. 1B-C and FIG. 2, respectively. Variable index light extraction layer 610 includes microreplicated posts 612, low index regions 613 including microreplicated posts 612 and air 614, and high-index region 615 including optical material 616. The variable index light extraction layer 610 is disposed between a substrate 630 and a sealing layer 620. Lightguide 640 including an output surface 642 is disposed on the other side of the sealing layer 620, and may be oriented so that a viewer may observe output surface 642. Light is provided to lightguide 640 by one or more light sources 644. A display surface 650 is disposed on the other side of the substrate 630, oriented such that the variable index light extraction layer 610 is disposed between the output surface 642 and the display surface 650. Display surface 650 is optically coupled to substrate 630.

Light is injected into the lightguide 640 by the one or more light sources 644. Supercritical light incident on the lightguide/air interface coextensive with output surface 642, for example, ray 670, is reflected by TIR. In some embodiments, the sealing layer 620 is index-matched with the lightguide 640 to permit light to reach the variable index light extraction layer 610 without significant reflection or refraction. The lightguide 640 can be formed from any suitable material and take any suitable shape. While illustrated with all sides as substantially planar in FIG. 6, one or more sides may be curved, slanted, or faceted.

The one or more light sources 644 may be any suitable light emitting device or substance. In some embodiments, the one or more light sources 644 include one or more light emitting diodes (LEDs). One or more of the LEDs may produce visible light, including white and colored light, or one or more of the LEDs may emit any other desired wavelength region. The one or more light sources 644 may be disposed outside of the lightguide 640 and may include suitable injection or collimation optics, or, in some embodiments, the one or more light sources may be disposed within the lightguide.

The one or more light sources 644 may also include cold-cathode compact fluorescent lamps (CCFLs), incandescent light bulbs, or ambient light. In some embodiments, the one or more light sources 644 may include suitable filters or phosphors.

Light incident on the variable index light extraction layer from the lightguide 640 may be reflected through TIR if incident on an area of low refractive index, such as region 613 including microreplicated posts 612 and air fraction 614. Alternatively, light may be extracted through the variable index light extraction layer 610 if incident on a high-index region 615 including optical material 616. Ray 672 shows a path of light emitted from the one or more light sources 644 and thereafter extracted through the variable index light extraction layer 610 by the high-index region 615. Though the ray 672 is shown as being refracted by the high-index region 615, the high-index region need not refract light: that is, in some embodiments, the high-index region may be index-matched with the sealing layer.

Light that passes through variable index light extraction layer 610 and substrate 630 may illuminate display surface 650. Illumination of the display surface may allow for the viewing of an image, graphic, or array of pixels on display surface 650. In some embodiments, display surface 650 may be an electrphoretic display panel, such as those sold by E-Ink (E-Ink Corporation, a subsidiary of E-Ink Holdings, Inc., Taiwan). Though display surface 650 is depicted in FIG. 6 as being separated from the substrate 630, in some embodiments the display surface 650 is laminated or attached to the substrate layer with any suitable process or materials, including laminating the layers with pressure sensitive adhesives.

Returning light is represented by light rays 674 and 676. Both rays pass through the variable index light extraction layer 610 and exit through output surface 642 where each may be observed by a viewer. Because the configuration depicted in FIG. 6 does not contain substantial scattering elements, the display surface may be viewed without significant distortion, haze, or other undesirable optical artifacts.

Figure 7:
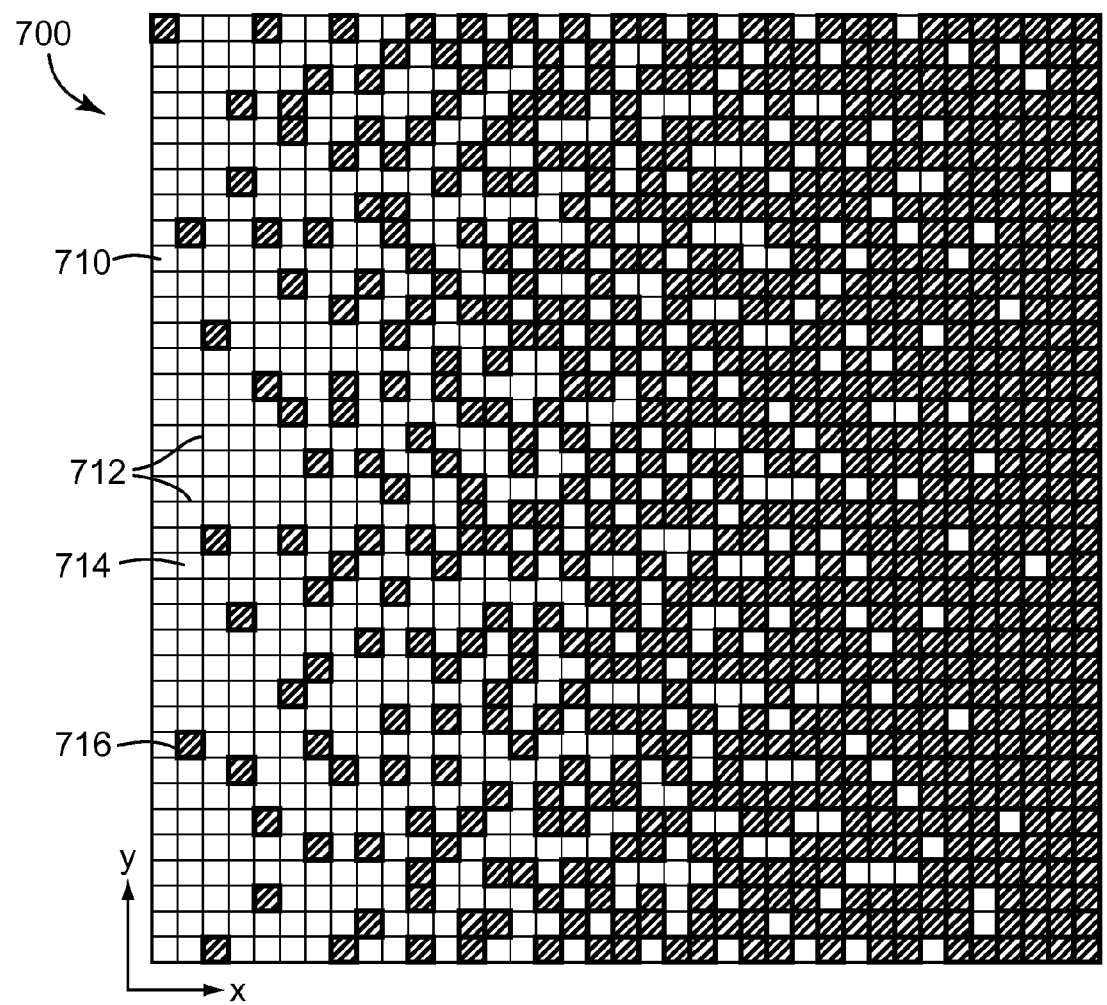
FIG. 7 is a top plan view of the variable index light extraction layer of FIG. 1B showing a two-dimensional gradient.

FIG. 7 depicts a plan view of a variable index light extraction layer 700, corresponding with variable index light extraction layer 100 and 200, showing a two-dimensional gradient of high-index regions. The layer may be characterized by two orthogonal in-plane axes, shown in FIG. 7 as x and y. Microreplicated posts 712 are arranged in a grid, the gridlines arranged parallel to the in-plane axes. Some two-dimensional regions 710 are filled with air 714, and some are filled with optical material 716.

Optical material 716 may partially fill two-dimensional regions 710. The pattern of air 714 regions and optical material 716 filled regions can be in any suitable configuration. For example, the proportion of the optical material 716 filled regions can increase or decrease in one or both in-plane directions. In some embodiments, the distribution may be random or pseudo-random. The distribution may be also any suitable function or pattern, including linear, non-linear, or some combination.

In some embodiments, for example, where variable index light extraction layer 700 is used in conjunction with an edge-lit lightguide, it may be advantageous to increase the frequency of optical material 716 filled layers as distance from the light source increases. Such configurations may extract a more even and uniform distribution of light.

Further, though the two-dimensional regions 710 defined by posts 712 are depicted as having a substantially square shape from a plan view, any suitable shape or design configuration can be used. For example, the cross-sections may be circular, elliptical, triangular, hexagonal, rectangular, or based on any other shape or polygon.

Likewise, though the two-dimensional regions 710 are depicted as being uniform in size and shape from a plan view, the dimensions and profile of the two-dimensional regions may vary across the variable index light extraction layer 700. For example, some embodiments may include one or more zones where the two-dimensional regions are of a particular size or shape. Other embodiments may gradually vary the size or shape of the two-dimensional regions 710 across one or more dimensions of the variable index light extraction layer 700.

Figure 8:
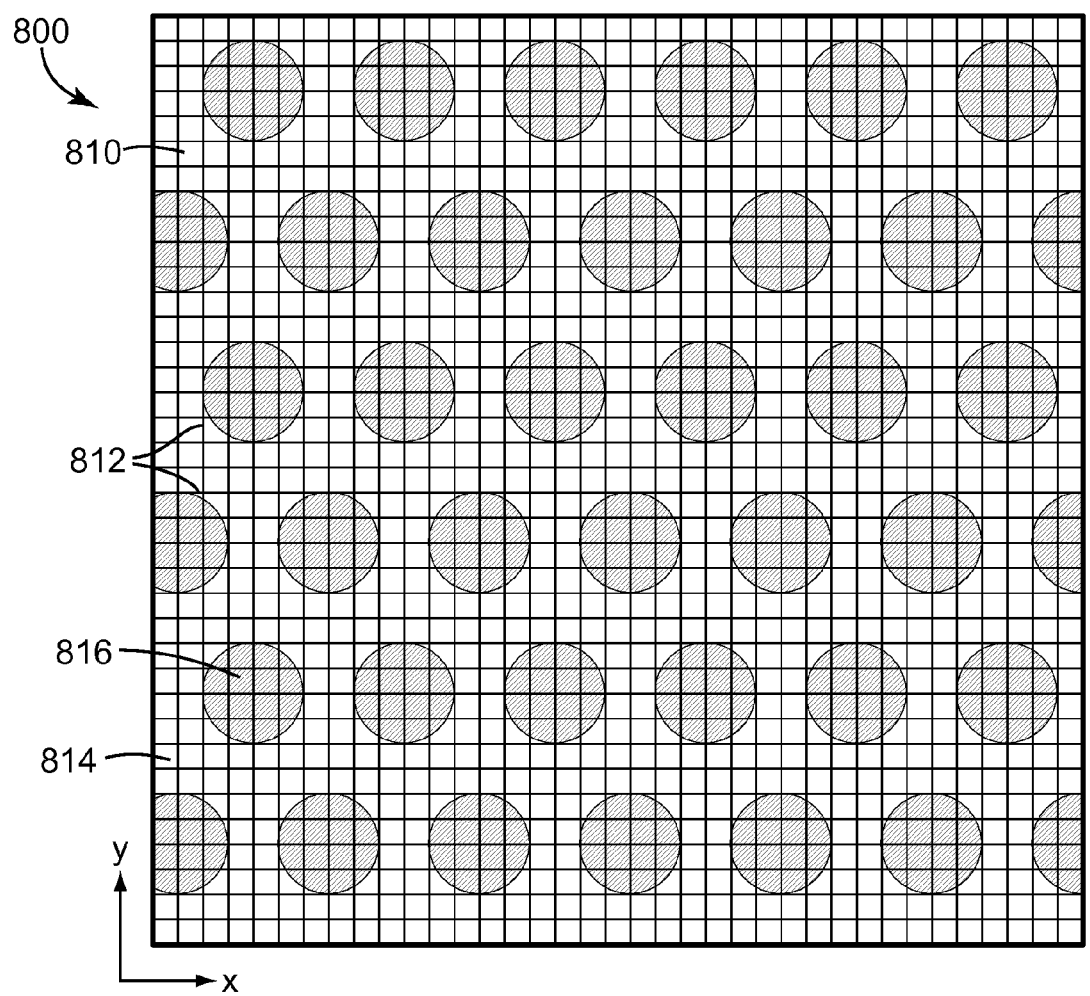
FIG. 8 is a top plan view of another variable index light extraction layer of FIG. 1B showing a pattern.

FIG. 8 depicts a plan view of another variable index light extraction layer 800, corresponding with variable index light extraction layers 100 and 200, showing a pattern of regions. Like variable index light extraction layer 700 shown in FIG. 7, microreplicated posts 812 create two-dimensional regions 810. Some are filled with air 814 while some are filled with optical material 816. FIG. 8 depicts a polka dot pattern superimposed on variable index light extraction layer 800, though any suitable pattern, image, emblem, insignia, company or product mark, repeating or non-repeating, may be used. The pattern may be selected to provide a decorative or ornamental effect or it may be selected to provide suitable or desired extraction performance or properties.

Figure 9:
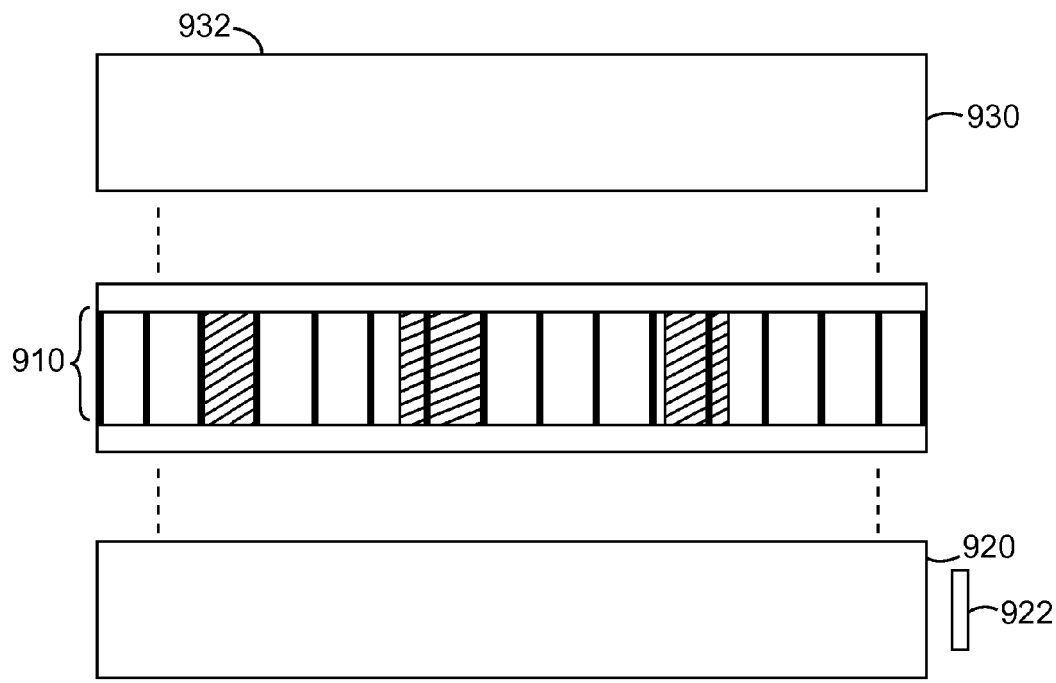
FIG. 9 is an exploded cross-sectional elevation view of a one-pass system using the film including a variable index light extraction layer of FIG. 2

FIG. 9 is an exploded cross-sectional elevation view of a one-pass system using light extraction film 910, corresponding to layer 200, substrate 210, and sealing layer 260 of FIG. 2. Lightguide 920 is optically coupled to a first major surface of light extraction film 910. In some embodiments, the lightguide 920 may be affixed or laminated to light extraction film 910 by a pressure sensitive or optically clear adhesive. In some embodiments, the adhesive may contain pigment or diffusing elements. In other embodiments, light extraction film 910 may be formed directly on lightguide 920, that is, the substrate 210 in FIG. 2 is itself lightguide 920.

Light is injected into the lightguide 920 by one or more light sources 922. Any suitable light source or combination of light sources, described in detail above, may be used. Suitable injection optics may be used if the one or more light sources 922 are external to the lightguide 920. Though the configuration of one or more light sources 922 and lightguide 920 suggest an edge-lit embodiment, direct-lit embodiments, where the one or more light sources 922 are disposed behind the lightguide 920, are possible and may be suitable in some applications.

A second major surface of light extraction film 910, opposite the lightguide 920, is optically coupled to a transmission layer 930, which includes an output surface 932. Transmission layer 930 may be any suitable element or combination of elements that redirect, diffuse, or scatter light. Alternatively, transmission layer 930 may simply be a transparent substrate to protect the components of the system or to add dimensional stability or prevent warping. Suitable elements include prism films, transparent polymeric materials, graphics, displays, polarizers, turning films, forward scattering films, diffusers, or any other element that may impart a desired optical effect, generate a desired image or pattern, or direct light with desired optical characteristics through output surface 932. Transmission layer 930 may be attached to the light extraction film 910 using any suitable method or materials, including pressure sensitive adhesives. Suitable configurations and constructions of transmission layers are described, for example, in U.S. Patent Application Ser. No. 61/485,881, entitled "Back-Lit Transmissive Display Having Variable Index Light Extraction Layer," and filed May 13, 2011.

One-pass systems illustrated generally by FIG. 9 may be used for a variety of applications. Applications of the system include providing general lighting, as in lamps or luminaires, or decorative lighting, as in architectural, automotive, or aviation applications or displays whether traditional displays like liquid crystal displays, transmissive liquid crystal displays, and transparent display panels. One-pass systems may also be utilized to illuminate signs, displays or other graphics. Further assemblies and applications are described, for example, in U.S. Patent Application Ser. No. 61/446,740, entitled "Front-Lit Reflective Display Device and Method of Front-Lighting Reflective Display," and filed Feb. 25, 2011.

Figure 10:
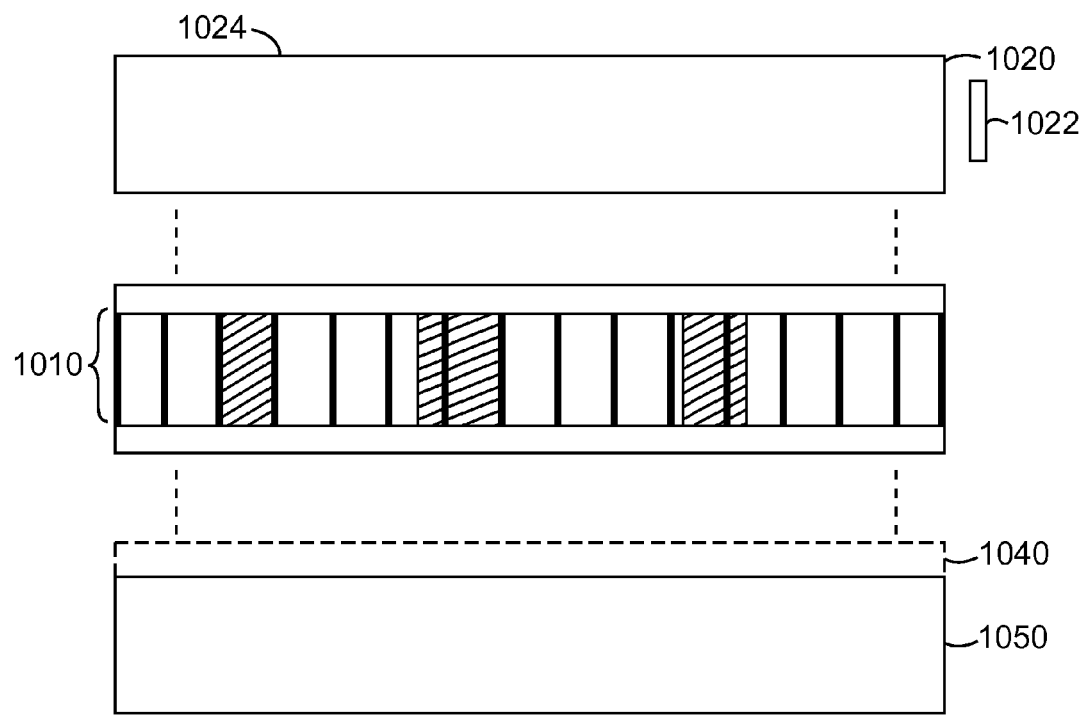
FIG. 10 is an exploded cross-sectional elevation view of a two-pass system using the film including a variable index light extraction layer of FIG. 2.

FIG. 10 is an exploded cross-sectional view of a two-pass system using light extraction film 1010, also corresponding to layer 200, substrate 210, and sealing layer 260 of FIG. 2. Lightguide 1020 including output surface 1024 is optically coupled to a first major surface of the light extraction film 1010. The lightguide may be affixed or laminated to the light extraction film 1010 by any suitable method and with any suitable materials, including pressure sensitive adhesives. In some embodiments, the lightguide 1020 is attached directly to the variable index light extraction layer, that is, the sealing layer 260 as shown in FIG. 2 is itself lightguide 1020.

One or more light sources 1022 are disposed to inject light into the lightguide 1020, and may include injection optics if the one or more light sources 1022 are external to the lightguide 1020. The one or more light sources 1022 may be any suitable light source or combination of light sources, described in more detail above.

Reflective element 1050 is optically coupled to light extraction film 1010. Reflective element 1050 can include any substantially reflective surface. In some embodiments, reflective element 1050 may be a reflective display including an array of pixels. In other embodiments, reflective element 1050 may be an electrophoretic display, a white reflector, semi-specular reflector, diffuse reflective metal surface, brushed metal surface, or any other suitable surface or display element.

Reflective element 1050 may be directly attached or laminated to the light extraction film 1010 or additional optical elements 1040 may be present between reflective element 1050 and the light extraction film 1010. The additional optical elements may be selected and configured to impart desirable characteristics to the light that eventually is transmitted through output surface 1024 of the lightguide. Suitable components of the additional optical elements may include light management films, polarizers, diffusers, multilayer optical films, adhesives with or without pigment or diffusing elements, or any other suitable component to adjust or manage light. Additional optical elements 1040 may be attached to both the reflective element 1050 and the light extraction film 1010 or it itself can be an attachment mechanism for reflective element 1050 and light extraction film 1010 (e.g., if additional optical elements 1040 include an adhesive).

Two-pass systems illustrated generally by FIG. 10 may be used for lighting reflective displays. Because reflective displays do not generate their own light, it can be difficult or impossible to read images in the dark or in low-light environments. A two-pass system, that is, generally front-lit applications of the variable index light extraction layer of the present disclosure, may provide the required illumination to view the display through a transparent and non-distorting front surface. Suitable reflective displays are described, for example, in U.S. Patent Application Ser. No. 61/446,740, entitled "Front-Lit Reflective Display Device and Method of Front-Lighting Reflective Display," and filed Feb. 25, 2011.

Other two-pass system applications of the variable index light extraction layer of the present disclosure include illuminating signs, displays, or graphics. Further, a two-pass system may be used for a lamp, a luminaire, or for general or decorative lighting, as in architectural, automotive, or aviation applications. Two-pass systems may also be configured to be backlit systems, for example, the output surface of the film using the variable index light extraction layer of the present disclosure may be used to illuminate a reflective scattering element, graphic or display. Suitable reflective scattering elements are described in U.S. Patent Application Ser. No. 61/446,712, entitled "Illumination Article and Device for Front-Lighting Reflective Scattering Element," and filed Feb. 25, 2011.

Both one- and two-pass systems may be used in a variety of lamps and luminaires, the configuration and parameters of which may be adjusted to suit the particular lighting application. For example, a variable index light extraction layer of the present disclosure may be used to create accent lighting for cabinets or appliances. Notably, because applications using a variable index light extraction layer of the present disclosure may be transparent and non-distorting, surfaces that appear otherwise clear and transparent may become lights, for example, refrigerator shelves. Likewise, a variable index light extraction layer of the present disclosure may be used in sunroofs for automobiles, as skylights, or any suitable window, mirror, or transparent surface.

EXAMPLES

Microreplicated "Post" Low Index Layers

I. 400 nm Pitch 1D Structures on PET Film

Figure 11:
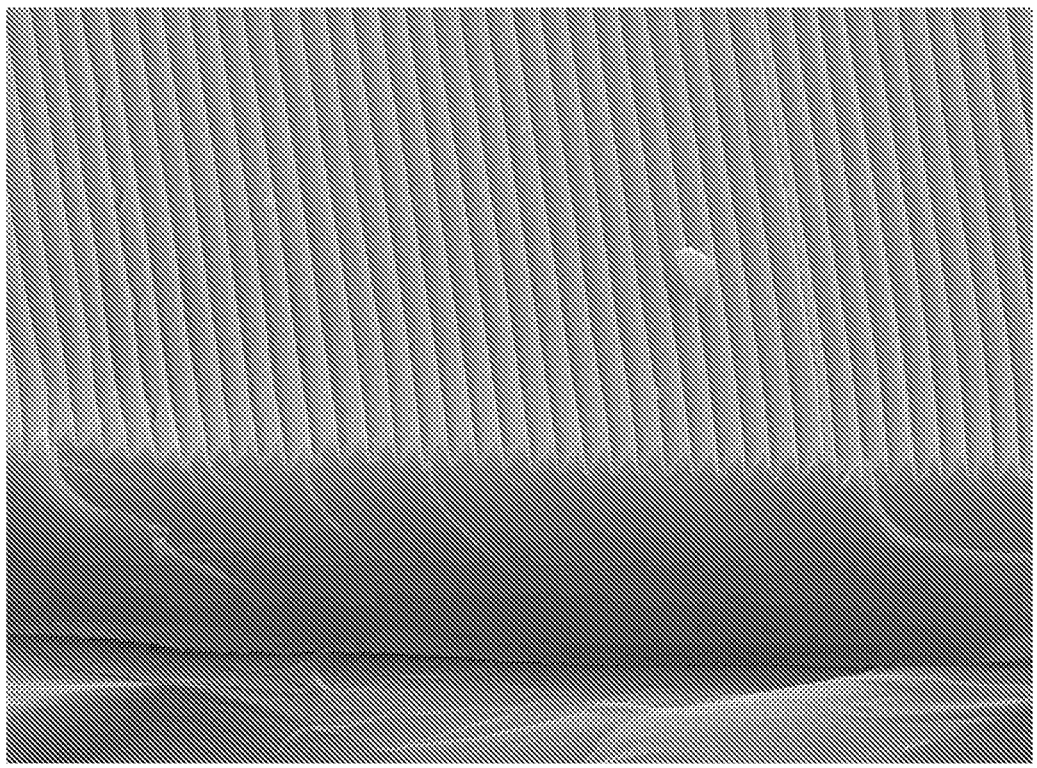
FIG. 11 is a scanning electron microscope image of a microreplication tool.

The microreplication tool used for this experimental example was a metallic cylindrical tool with a "sawtooth" 1-dimensional structure (linearly extending prisms with a 400 nm pitch). The one-dimensional structure was created by cutting into the copper surface of the cylindrical tool using a precision diamond turning machine. The resulting copper cylinder with precision-cut "sawtooth" features (an SEM image of which is shown in FIG. 11) was nickel plated and coated with a release coating. The plating and coating process of the copper master cylinder is a common practice used to promote release of cured resin during the microreplication process. The film replicate was made using an acrylate resin composition including acrylate monomers (75% by weight PHOTOMER 6210 material available from Cognis, Monheim, Germany, and 25% by weight 1,6-hexanedioldiacrylate available from Aldrich Chemistry, Milwaukee, Wis.) and a photoinitiator (1% by weight DAROCUR 1173 material, Ciba Specialty Chemicals, Basel, Switzerland) that was cast onto a PET support film (MELINEX 454 film from Dupont Teijin Films, Hopewell, Va., 2 mil thickness) and then cured against the precision patterned cylindrical tool using ultraviolet light, 236 Watts/cm Fusion H bulb (commercially available from Fusion UV System, Gaithersburg, Md.). The resulting microreplicated film appearance when viewed at an angle normal to the surface of the film is transparent and has subtle rainbow colored (note: the appearance of color is highly dependent upon incident light on the film and for this 1-D structure light incident on the film with a direction orthogonal to the direction of the 1D microreplicated structure creates a stronger colored appearance). The optical properties of the film were measured using a BYK Gardener HAZE-GARD PLUS instrument (available from BYK-Gardner USA, Silver Springs, Md.) and had a transmission of 82.3%, haze of 7.95%, and clarity of 96.1%. The average transmission as measured on a LAMBDA 900 spectrometer (available from PerkinElmer, Waltham, Mass.) from 400 nm to 700 nm was 86.6% with the light incident on the structured side of the film. The volume defined by the microreplicated features (height from base of the structure to the tips of the structure and the length and width of the plurality of replicated structures) and the air between them represents a low index layer with an effective refractive index of 1.26, which is the average of the resin refractive index n=1.53 and the air n=1.0.

II. 250 nm Pitch 1D Structures on PET Film

The microreplication tool used for this experimental example was a metallic cylindrical tool with a "sawtooth" 1-dimensional structure (linearly extending prisms with a ~250 nm pitch). The 1-dimensional structure was created and replicated using the same processes used above for the 400 nm pitch 1D structure. The resulting microreplicated film appearance when viewed at an angle normal to the surface of the film is transparent and colorless. The optical properties of the film were measured using a BYK Gardener HAZE-GARD PLUS instrument (available from BYK-Gardner USA, Silver Springs, Md.) and had a transmission of 94.6%, haze of 0.94%, and clarity of 97%. The volume defined by the microreplicated features (height from base of the structure to the tips of the structure and the length and width of the plurality of replicated structures) and the air between them represents a low index layer with an effective refractive index of 1.26 which is the average of the resin refractive index n=1.53 and the air n=1.0.

III. 150 nm Pitch 1D Structures on PET Film

The microreplication tool used for this experimental example was a metallic cylindrical tool with a "sawtooth" 1-dimensional structure (linearly extending prisms with a ~150 nm pitch). The 1-dimensional structure was created and replicated using the same processes used above for the 400 nm pitch 1D structure. The resulting microreplicated film appearance when viewed at an angle normal to the surface of the film is transparent and colorless. The optical properties of the film were measured using a BYK Gardener HAZE-GARD PLUS instrument (available from BYK-Gardner USA, Silver Springs, Md.) and had a transmission of 95.1%, haze of 0.46%, and clarity of 99.1%. The volume defined by the microreplicated features (height from base of the structure to the tips of the structure and the length and width of the plurality of replicated structures) and the air between them represents a low index layer with an effective refractive index of 1.26 which is the average of the resin refractive index n=1.53 and the air n=1.0.

IV. 5 Micron Pitch 1D Prism Structures on PET Film

The microreplication tool used for this experimental example was a metallic cylindrical tool with a 1-dimensional symmetric prism structure with 90 degree included angle (linearly extending triangular prisms with a 5 micron pitch, prism height 2.5 microns). The 1-dimensional structure was created and replicated using the same processes used above for the 400 nm pitch 1D structure. The resulting microreplicated film appearance when viewed at an angle normal to the surface of the film is transparent and colorless. The optical properties of the film were measured using a BYK Gardener HAZE-GARD PLUS instrument (available from BYK-Gardner USA, Silver Springs, Md.) and had a transmission of 95.1%, haze of 0.46%, and clarity of 99.1%. The average transmission as measured on a LAMBDA 900 spectrometer from 400 and 700 nm was 94.9% with the light incident on the structured side of the film. The volume defined by the top of the microreplicated features (a volume defined by the array of prisms features in the x, y plane and a height from the tips of the prisms to ~⅓ of the way down the prism structure, a z-axis distance of ~1 micron) and the air between them represents a low index layer with an effective refractive index of ~1.20 which is the average of the resin refractive index n=1.53 and the air n=1.0.

Example 1

Microreplicated "Post" Variable Index Light Extraction Layer and Illumination Device (400 nm 1-D Low Index Layer and PSA Backfill, 2-Pass)

Formation of Variable Index Light Extraction Layer

The liner on one side of 3M 8171 Optically Clear Adhesive (available from 3M Company, St. Paul, Minn.) was removed and a UV-curable clear varnish (UV OP1005 GP Varnish, available from Nazdar, Shawnee Mission, Kans.) was printed onto the surface of the adhesive using an indirect gravure printing process. The pattern was printed using a flexographic tool having a pattern of repeating lines or areas that were 3 mm×150 mm the 3 mm lines being separated by 3 mm spaces. The flexographic tool was fabricated by Southern Graphics Systems (Minneapolis, Minn.) based on a PDF image that defined the pattern. The patterned UV curable layer acts as a "blocking" layer at the surface of the adhesive. The UV-curable clear varnish was printed at a speed of 10 m/min, using an anilox roll with an approximate volume of 5 BCM/inch$^2$ (rated to give a wet coating of approximately 4 microns). After printing the clear varnish onto the surface of the 8171 adhesive, the ink was cured (cross-linked) into a clear, non-adhesive amorphous glass-like layer with a Fusion high-intensity UV lamp outfitted with an H-bulb (available from Fusion UV System, Gaithersburg, Md.).

The patterned adhesive layer (3M 8171 Optically Clear Adhesive plus patterned blocking layer) was then laminated to the microreplicated film (I) described above, such that the un-blocked, or exposed, areas of optically clear adhesive were free to flow into and fill the regions between the replicated nanostructures (i.e. resulting in high-refractive index regions); adhesive in areas blocked by the clear varnish did not flow or move to fill the nano-replicated features, instead leaving trapped cells of air (i.e. a low-refractive index region) between the blocking laying and the base of the nano-replicated posts or grooves. The patterned adhesive was laminated to the microreplicated structure such that the 3 mm wide lines of the printed and cured clear varnish were orthogonal to the replicated 1-D linear saw-tooth structure. The resulting assembly is a variable index light extraction layer.

Assembly of Lighting Device

The variable index light extraction layer was laminated to a 90 mm×120 mm acrylic lightguide that was 2 mm thick with a 1 mil adhesive (3M Optically Clear Adhesive 8171). The lightguide was then laminated to a reflective white film (Micro-cavitated PET, CRISPER 5 mil K2323 film available from Sanyo Corp. of America). LED light was then injected into the edge of the acrylic lightguide (LED light was injected from an edge orthogonal to the linear replicated structure) and the white reflective layer was illuminated in pattern corresponding to the inverse pattern of the printed blocking layer on the adhesive described above. A PRO-METRIC camera (available from Radiant Imaging, Inc., Redmond, Wash.) was used to evaluate the illumination device and the contrast between patterned area and non-patterned areas of the VILEL exhibited a contrast ratio of greater than 2:1.

Example 2

Microreplicated "Post" Variable Index Light Extraction Layer and Illumination Device (250 nm 1-D Low Index Layer and PSA Backfill, 2-Pass)

Formation of Variable Index Light Extraction Layer

The liner on one side of 3M 8171 Optically Clear Adhesive (available from 3M Company, St. Paul, Minn.) was removed and a UV-curable clear varnish (UV OP1005 GP Varnish, available from Nazdar, Shawnee Mission, Kans.) was printed onto the surface of the adhesive using an indirect gravure printing process. The pattern was printed using a flexographic tool having a pattern of repeating lines or areas that were 3 mm×150 mm the 3 mm lines being separated by 3 mm spaces. The flexographic tool was fabricated by Southern Graphics Systems (Minneapolis, Minn.) based on a PDF image that defined the pattern. The patterned UV curable layer acts as a "blocking" layer at the surface of the adhesive. The UV-curable clear varnish was printed at a speed of 10 m/min, using an anilox roll with an approximate volume of 5 BCM/inch$^2$ (rated to give a wet coating of approximately 4 microns). After printing the clear varnish onto the surface of the 8171 adhesive, the ink was cured (cross-linked) into a clear, non-adhesive amorphous glass-like layer with a Fusion high-intensity UV lamp outfitted with an H-bulb (available from Fusion UV System, Gaithersburg, Md.).

The patterned adhesive layer (3M 8171 Optically Clear Adhesive plus patterned blocking layer) was then laminated to the microreplicated film (II) described above, such that the un-blocked, or exposed, areas of optically clear adhesive were free to flow into and fill the regions between the replicated nanostructures (i.e. resulting in high-refractive index regions); adhesive in areas blocked by the clear varnish did not flow or move to fill the nano-replicated features, instead leaving trapped cells of air (i.e. a low-refractive index region) between the blocking laying and the base of the nano-replicated posts or grooves. The patterned adhesive was laminated to the microreplicated structure such that the 3 mm wide lines of the printed and cured clear varnish were orthogonal to the replicated 1-D linear saw-tooth structure. The resulting assembly is a variable index light extraction layer.

Assembly of Lighting Device

The variable index light extraction layer was laminated to a 90 mm×120 mm acrylic lightguide that was 2 mm thick with a 1 mil adhesive (3M Optically Clear Adhesive 8171). The lightguide was then laminated to a reflective white film (Micro-cavitated PET, CRISPER 5 mil K2323 film available from Sanyo Corp. of America). LED light was then injected into the edge of the acrylic lightguide (LED light was injected from an edge orthogonal to the linear replicated structure) and the white reflective layer was illuminated in pattern corresponding to the inverse pattern of the printed blocking layer on the adhesive described above. A PRO-METRIC camera (available from Radiant Imaging, Inc., Redmond, Wash.) was used to evaluate the illumination device and the contrast between patterned area and non-patterned areas of the VILEL exhibited a contrast ratio of greater than 3:1.

Example 3

Microreplicated "Post" Variable Index Light Extraction Layer and Illumination Device (150 nm 1-D Low Index Layer and PSA Backfill, 2-Pass)

Formation of Variable Index Light Extraction Layer

The liner on one side of 3M 8171 Optically Clear Adhesive (available from 3M Company, St. Paul, Minn.) was removed and a UV-curable clear varnish (UV OP1005 GP Varnish, available from Nazdar, Shawnee Mission, Kans.) was printed onto the surface of the adhesive using an indirect gravure printing process. The pattern was printed using a flexographic tool having a pattern of repeating lines or areas that were 3 mm×150 mm the 3 mm lines being separated by 3 mm spaces. The flexographic tool was fabricated by Southern Graphics Systems (Minneapolis, Minn.) based on a PDF image that defined the pattern. The patterned UV curable layer acts as a "blocking" layer at the surface of the adhesive. The UV-curable clear varnish was printed at a speed of 10 m/min, using an anilox roll with an approximate volume of 5 BCM/inch$^2$ (rated to give a wet coating of approximately 4 microns). After printing the clear varnish onto the surface of the 8171 adhesive, the ink was cured (cross-linked) into a clear, non-adhesive amorphous glass-like layer with a Fusion high-intensity UV lamp outfitted with an H-bulb (available from Fusion UV System, Gaithersburg, Md.).

The patterned adhesive layer (3M 8171 Optically Clear Adhesive plus patterned blocking layer) was then laminated to the microreplicated film (III) described above, such that the un-blocked, or exposed, areas of optically clear adhesive were free to flow into and fill the regions between the replicated nanostructures (i.e. resulting in high-refractive index regions); adhesive in areas blocked by the clear varnish did not flow or move to fill the nano-replicated features, instead leaving trapped cells of air (i.e. a low-refractive index region) between the blocking laying and the base of the nano-replicated posts or grooves. The patterned adhesive was laminated to the microreplicated structure such that the 3 mm wide lines of the printed and cured clear varnish were orthogonal to the replicated 1-D linear sawtooth structure. The resulting assembly is a variable index light extraction layer.

Assembly of Lighting Device

The variable index light extraction layer was laminated to a 90 mm×120 mm acrylic lightguide that was 2 mm thick with a 1 mil adhesive (3M Optically Clear Adhesive 8171). The lightguide was then laminated to a reflective white film (Micro-cavitated PET, CRISPER 5 mil K2323 film available from Sanyo Corp. of America). LED light was then injected into the edge of the acrylic lightguide (LED light was injected from an edge orthogonal to the linear replicated structure) and the white reflective layer was illuminated in pattern corresponding to the inverse pattern of the printed blocking layer on the adhesive described above. A PRO-METRIC camera (available from Radiant Imaging, Inc., Redmond, Wash.) was used to evaluate the illumination device and the contrast between patterned area and non-patterned areas of the VILEL exhibited a contrast ratio of greater than 7:1.

Example 4

Microreplicated "Post" Variable Index Light Extraction Layer and Illumination Device (5 Micron 1-D Prism Low Index Layer and PSA Backfill, 2-Pass)

Formation of Variable Index Light Extraction Layer

The liner on one side of 3M 8171 Optically Clear Adhesive (available from 3M, St. Paul, Minn. 55144) was removed and a UV-curable clear varnish (UV OP1005 GP Varnish, available from Nazdar, Shawnee Mission, Kans.) was printed onto the surface of the adhesive using an indirect gravure printing process. The pattern was printed using a flexographic tool having a pattern of repeating lines or areas that were 3 mm×150 mm the 3 mm lines being separated by 3 mm spaces. The flexographic tool was fabricated by Southern Graphics Systems (Minneapolis, Minn.) based on a PDF image that defined the pattern. The patterned UV curable layer acts as a "blocking" layer at the surface of the adhesive. The UV-curable clear varnish was printed at a speed of 10 m/min, using an anilox roll with an approximate volume of 5 BCM/inch$^2$ (rated to give a wet coating of approximately 4 microns). After printing the clear varnish onto the surface of the 8171 adhesive, the ink was cured (cross-linked) into a clear, non-adhesive amorphous glass-like layer with a Fusion high-intensity UV lamp outfitted with an H-bulb (available from Fusion UV System, Gaithersburg, Md.).

The patterned adhesive layer (3M 8171 Optically Clear Adhesive plus patterned blocking layer) was then laminated to the microreplicated film (IV) described above, such that the un-blocked, or exposed, areas of optically clear adhesive were free to flow into and fill the regions between the replicated nanostructures (i.e. resulting in high-refractive index regions); adhesive in areas blocked by the clear varnish did not flow or move to fill the nano-replicated features, instead leaving trapped cells of air (i.e. a low-refractive index region) between the blocking laying and the base of the nano-replicated posts or grooves. The patterned adhesive was laminated to the microreplicated structure such that the 3 mm wide lines of the printed and cured clear varnish were orthogonal to the replicated 1-D linear prism structure. The resulting assembly is a variable index light extraction layer.

Assembly of Lighting Device

The variable index light extraction layer was laminated to a 90 mm×120 mm acrylic lightguide that was 2 mm thick with a 1 mil adhesive (3M Optically Clear Adhesive 8171). The lightguide was then laminated to a reflective white film (Micro-cavitated PET, CRISPER 5 mil K2323 film available from Sanyo Corp. of America). LED light was then injected into the edge of the acrylic lightguide (LED light was injected from an edge orthogonal to the linear replicated structure) and the white reflective layer was illuminated in pattern corresponding to the inverse pattern of the printed blocking layer on the adhesive described above. A PROMETRIC camera (available from Radiant Imaging, Inc., Redmond, Wash.) was used to evaluate the illumination device and the contrast between patterned area and non-patterned areas of the VILEL exhibited a contrast ratio of greater than 3:1.

Example 5

Microreplicated "Post" Variable Index Light Extraction Layer and Illumination Device (150 nm 1-D Low Index Layer and Hot Melt Adhesive Backfill, 2-Pass)

Formation of Variable Index Light Extraction Layer

Onto the surface of a hot melt adhesive PRIMACORE 3330 material (2 mil thick ethylene acrylic acid from Dow Chemical Company, Midland, Mich.) supported on a 2.4 liner polyester film as liner, was printed a UV-curable clear varnish (UV OP1005 GP Varnish, available from Nazdar, Shawnee Mission, Kans.) using an indirect gravure printing process. The pattern was printed using a flexographic tool having a pattern of repeating lines or areas that were 3 mm×150 mm, the 3 mm lines being separated by 3 mm spaces. The flexographic tool was fabricated by Southern Graphics Systems (Minneapolis, Minn.) based on a PDF image that defined the pattern. The patterned UV curable layer acts as a "blocking" layer at the surface of the adhesive. The UV-curable clear varnish was printed at a speed of 25 ft/min, using an anilox roll with an approximate volume of 4 BCM/inch$^2$ (rated to give a wet coating of approximately 4 microns). After printing the clear varnish onto the surface of the hot melt adhesive, the ink was cured (cross-linked) into a clear, non-adhesive amorphous glass-like layer with a Fusion high-intensity UV lamp outfitted with an H-bulb (available from Fusion UV System, Gaithersburg, Md.).

The patterned hot melt adhesive layer (ethylene acrylic acid plus patterned blocking layer) was then laminated with heat (180 degrees Fahrenheit) and pressure 20 psi through rollers to the microreplicated film (III) described above, such that the un-blocked, or exposed, areas of optically clear adhesive were free to flow into and fill the regions between the replicated nanostructures (i.e. resulting in high-refractive index regions); adhesive in areas blocked by the clear varnish did not flow or move to fill the nano-replicated features, instead leaving trapped cells of air (i.e. a low-refractive index region) between the blocking laying and the base of the nano-replicated posts or grooves. The patterned adhesive was laminated to the microreplicated structure such that the 3 mm wide lines of the printed and cured clear varnish were orthogonal to the replicated 1-D linear sawtooth structure. The resulting assembly comprises a variable index light extraction layer.

Assembly of Lighting Device

The variable index light extraction layer was laminated to a 90 mm×120 mm acrylic lightguide that was 2 mm thick with a 1 mil adhesive (3M Optically Clear Adhesive 8171). The lightguide was then laminated to a reflective white film (Micro-cavitated PET, CRISPER 5 mil K2323 film available from Sanyo Corp. of America). LED light was then injected into the edge of the acrylic lightguide (LED light was injected from an edge orthogonal to the linear replicated structure) and the white reflective layer was illuminated in pattern corresponding to the inverse pattern of the printed blocking layer on the adhesive described above. A PROMETRIC camera (available from Radiant Imaging, Inc., Redmond, Wash.) was used to evaluate the illumination device and the contrast between patterned area and non-patterned areas of the VILEL exhibited a contrast ratio of greater than 2:1.

Example 6

Microreplicated "Post" Variable Index Light Extraction Layer and Illumination Device (250 nm 1-D Low Index Layer and Hot Melt Adhesive Backfill, 1-Pass)

Formation of Variable Index Light Extraction Layer

Onto the surface of a hot melt adhesive PRIMACORE 3330 material (2 mil thick ethylene acrylic acid from Dow Chemical Company, Midland, Mich.) supported on a 2.4 liner polyester film as liner, was printed a UV-curable clear varnish (UV OP1005 GP Varnish, available from Nazdar, Shawnee Mission, Kans.) using an indirect gravure printing process. The pattern was printed using a flexographic tool having image wise patterns showing a variety of images (an eagle, an American flag, and the outline of a state) all approximately 1-2 cm$^2$ in size. The flexographic tool was fabricated by Southern Graphics Systems (Minneapolis, Minn.) based on a PDF image that defined the pattern. The patterned UV curable layer acts as a "blocking" layer at the surface of the adhesive. The UV-curable clear varnish was printed at a speed of 25 ft/min, using an anilox roll with an approximate volume of 4 BCM/inch$^2$ (rated to give a wet coating of approximately 4 microns). After printing the clear varnish onto the surface of the hot melt adhesive, the ink was cured (cross-linked) into a clear, non-adhesive amorphous glass-like layer with a Fusion high-intensity UV lamp outfitted with an H-bulb (available from Fusion UV System, Gaithersburg, Md.).

The patterned hot melt adhesive layer (ethylene acrylic acid plus patterned blocking layer) was then laminated with heat (180 degrees Fahrenheit) and pressure 20 psi through rollers to the microreplicated film (II) described above, such that the un-blocked, or exposed, areas of optically clear adhesive were free to flow into and fill the regions between the replicated nanostructures (i.e. resulting in high-refractive index regions); adhesive in areas blocked by the clear varnish did not flow or move to fill the nano-replicated features, instead leaving trapped cells of air (i.e. a low-refractive index region) between the blocking laying and the base of the nano-replicated posts or grooves. The resulting assembly comprises a variable index light extraction layer.

Assembly of Lighting Device

The variable index light extraction layer was laminated to a 90 mm×120 mm acrylic lightguide that was 2 mm thick with a 1 mil adhesive (3M Optically Clear Adhesive 8171). To the adhesive on the opposite side of the variable light extraction was laminated a surface diffuser film (Keiwa BS-42 film available from Keiwa Inc., Tokyo, Japan). LED light was then injected into the edge of the acrylic lightguide (LED light was injected from an edge orthogonal to the linear replicated structure) and the light was extracted from the lightguide and illuminated in pattern wise fashion on the surface diffuser film corresponding to the inverse pattern of the printed blocking layer on the adhesive described above. A PROMETRIC camera (available from Radiant Imaging, Inc., Redmond, Wash.) was used to evaluate the illumination device and the contrast between patterned area and non-patterned areas of the VILEL exhibited a contrast ratio of greater than 3:1.

Example 7

Microreplicated "Post" Variable Index Light Extraction Layer and Frontlight (150 nm 1-D Low Index Layer and PSA Backfill)

Formation of Variable Index Light Extraction Layer

The liner on one side of 3M 8171 Optically Clear Adhesive (available from 3M, St. Paul, Minn. 55144) was removed and a UV-curable clear varnish (UV OP1005 GP Varnish, available from Nazdar, Shawnee Mission, Kans.) was printed onto the surface of the adhesive using an indirect gravure printing process. The pattern was printed using a flexographic tool having a gradient pattern of randomized 100 micron dots. The flexographic tool was fabricated by Southern Graphics Systems (Minneapolis, Minn.) based on a pdf image that defined the pattern. The density of the printed pattern varied from ~5% areal coverage on the low density side to ~35% areal coverage on the high density side. The patterned UV curable layer acts as a "blocking" layer at the surface of the adhesive. The UV-curable clear varnish was printed at a speed of 10 m/min, using an anilox roll with an approximate volume of 5 BCM/inch$^2$ (rated to give a wet coating of approximately 4 microns). After printing the clear varnish onto the surface of the 8171 adhesive, the ink was cured (cross-linked) into a clear, non-adhesive amorphous glass-like layer with a Fusion high-intensity UV lamp outfitted with an H-bulb (available from Fusion UV System, Gaithersburg, Md.).

The patterned adhesive layer (3M 8171 Optically Clear Adhesive plus patterned blocking layer) was then laminated to the microreplicated film (III) described above, such that the un-blocked, or exposed, areas of optically clear adhesive were free to flow into and fill the regions between the replicated nanostructures (i.e. resulting in high-refractive index regions); adhesive in areas blocked by the clear varnish did not flow or move to fill the nano-replicated features, instead leaving trapped cells of air (i.e. a low-refractive index region) between the blocking laying and the base of the nano-replicated posts or grooves. The resulting assembly is a variable index light extraction layer.

Front-Lit Reflective Display Device

The PET side of the variable index light extraction layer is laminated to a 90 mm×120 mm acrylic lightguide that is 1 mm thick with a 1 mil adhesive (3M Optically Clear Adhesive 8171). The liner of the 8171 adhesive of the variable index light extraction layer is removed and laminated to a layer of self wetting adhesive such as those described in commonly owned and assigned United States Patent Application Publication Nos. US 2011/0123800 A1 (Sherman et al.). The lightguide assembly is adhered to the display panel of an electrophoretic electronic-book reader (KINDLE e-reader available from Amazon.com, Seattle, Wash.).

A light engine assembly is obtained and consisting of 5 edge-emitting white LEDs (NSSW230T LEDs from Nichia, Tokushima, Japan) mounted in a bezel. Two reflectors comprising multilayer polymeric mirror film (VIKUITI ESR from 3M Co., St Paul, Minn.) are also included in the bezel to form an optical wedge to collimate the light emitted from the LEDs. A slight angle of around 10° is built into the bezel to provide optical collimation. The light from the LED engine is designed to emit into an air gap region such that the light is injected at supercritical angles into the edge of the lightguide along the top side, horizontal axis, of the display. This results in a front-lit reflective display device where the front light assembly does not negatively affect the image on the display when looking through the lightguide assembly having the variable index light extraction layer (i.e. the assembly creates little to no distortion of the image).

A PROMETRIC camera (available from Radiant Imaging, Inc., Redmond, Wash.) is used to evaluate uniformity of the illumination across the display surface. The uniformity is measured at 9 equally distributed points over the area of the display (points located at the following positions relative to the top left corner of the display being 0 mm, 0 mm: Top Row: (30 mm, 20 mm), (30 mm, 50 mm), (30 mm, 70 mm); Middle Row: (60 mm, 20 mm), (60 mm, 50 mm), (60 mm, 70 mm); Bottom Row: (90 mm, 20 mm), (90 mm, 50 mm), (90 mm, 70 mm); and the uniformity is calculated to be >70% using the formula $[(L_{max}-L_{min})/L_{max}]\times 100\%$.

Comparative Example 1

Front-Lit Reflective Display Device without the Variable Index Light Extraction Layer A front-lit reflective display device is assembled as described above for Example 7 with the exception that the variable index light extraction layer on PET support is not included. The acrylic lightguide is adhered to the viewing panel of the e-reader using 3M 8180 Optically Clear Adhesive (available from 3M Company, St. Paul, Minn.). The uniformity is measured at 9 points as described above and is calculated to be <50%.) Uniformity is calculated using the formula $[(L_{max}-L_{min})/L_{max}]\times 100\%$.

All U.S. patent applications cited in the present application are incorporated herein by reference as if fully set forth. The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

The following are exemplary embodiments according to the present disclosure:

Item 1. A variable index light extraction layer, comprising:
a plurality of microreplicated posts;
a first region comprising a first substance and at least a portion of the plurality of microreplicated posts; and
a second region comprising a second substance;
wherein from a plan view the first and second regions do not overlap;
wherein the first region has a lower effective index of refraction than the second region; and
wherein the first region, the second region, and the plurality of microreplicated posts together form a continuous layer.

Item 2. The variable index light extraction layer of item 1, wherein the first substance comprises air.

Item 3. The variable index light extraction layer of item 1, wherein the second substance comprises an adhesive.

Item 4. The variable index light extraction layer of item 1, wherein the second substance comprises an ink.

Item 5. The variable index light extraction layer of item 1, wherein the second substance has a refractive index greater than 1.4.

Item 6. The variable index light extraction layer of item 1, wherein the plurality of microreplicated posts comprises a nanoporous material.

Item 7. The variable index light extraction layer of item 1, wherein the first region has an effective index of refraction less than 1.4.

Item 8. The variable index light extraction layer of item 1, wherein the second region comprises at least a portion of the plurality of microreplicated posts.

Item 9. A optical film, comprising:
- a variable index light extraction layer comprising a plurality of microreplicated posts, a first region comprising a first substance and at least a portion of the plurality of microreplicated posts, and a second region comprising a second substance, wherein from a plan view the first and second regions do not overlap, wherein the first region has a lower effective index of refraction than the second region, and wherein the first region, the second region, and the plurality of microreplicated posts together form a continuous layer;
- a substrate layer; and
- a sealing layer;
- wherein the sealing layer is optically coupled to a first major surface of the variable index light extraction layer; and
- wherein the substrate layer is optically coupled to a second major surface of the variable index light extraction layer, opposite the sealing layer.

Item 10. The optical film of item 9, wherein the sealing layer comprises an adhesive.

Item 11. The optical film of item 10, further comprising a blocking layer, wherein the blocking layer is disposed between the adhesive and the at least a portion of the plurality of microreplicated posts.

Item 12. The optical film of Item 9, further comprising a lightguide optically coupled to the sealing layer.

Item 13. The optical film of item 9, further comprising a lightguide optically coupled to the substrate layer.

Item 14. The optical film of item 12, further comprising a reflective display panel configured to reflect light toward the variable index light extraction layer.

Item 15. A method of forming a variable index light extraction layer, comprising:
- microreplicating a plurality of posts on a substrate; and
- selectively applying a substance within portions of an area between the posts;
- wherein a first region comprises at least a portion of the plurality of posts and portions of an area between the posts not filled by the substance;
- wherein a second region comprises portions of the area between the posts filled by the substance;
- wherein the first region has a lower effective index of refraction than the second region.

Item 16. The method of item 15, wherein the substance comprises an ink.

Item 17. The method of item 15, wherein the substance comprises an adhesive.

Item 18. The method of item 15, wherein microreplicating the plurality of posts on the substrate comprises using a cast and cure method.

Item 19. The method of Item 15, wherein selectively applying the substance on the substrate comprises using an indirect gravure printing process.

Item 20. A method of forming a variable index light extraction layer, comprising:
- microreplicating a plurality of posts on a substrate, forming a pattern comprising spaces between the posts;
- selectively forming a blocking layer on an adhesive of a sealing layer; and
- attaching the sealing layer to the substrate such that the blocking layer prevents penetration of the adhesive into one or more of the spaces between the posts;
- wherein a first region comprises one or more spaces between the posts without adhesive penetration; and
- wherein a second region comprises the spaces at least partially filled by the adhesive of the sealing layer.

What is claimed is:

1. A variable index light extraction layer, comprising:
   a plurality of microreplicated posts;
   a first region comprising portions of an area between the posts filled by a first substance and at least a portion of the plurality of microreplicated posts; and
   a second region comprising portions of the area between the posts filled by a second substance, wherein the refractive index of the first substance and the refractive index of the second substance are different;
   wherein from a plan view the first and second regions do not overlap;
   wherein the first region has a lower effective index of refraction than the second region; and
   wherein the first region, the second region, and the plurality of microreplicated posts together form a continuous layer.

2. The variable index light extraction layer of claim 1, wherein the first substance comprises air.

3. The variable index light extraction layer of claim 1, wherein the second substance comprises an adhesive.

4. The variable index light extraction layer of claim 1, wherein the second substance comprises an ink.

5. The variable index light extraction layer of claim 1, wherein the second substance has a refractive index greater than 1.4.

6. The variable index light extraction layer of claim 1, wherein the plurality of microreplicated posts comprises a nanoporous material.

7. The variable index light extraction layer of claim 1, wherein the first region has an effective index of refraction less than 1.4.

8. The variable index light extraction layer of claim 1, wherein the second region comprises at least a portion of the plurality of microreplicated posts.

9. A optical film, comprising:
   a variable index light extraction layer comprising a plurality of microreplicated posts, a first region comprising portions of an area between the posts filled by a first substance and at least a portion of the plurality of microreplicated posts, and a second region comprising portions of the area between the posts filled by a second substance, wherein the refractive index of the first substance and the refractive index of the second substance are different, wherein from a plan view the first and second regions do not overlap, wherein the first region has a lower effective index of refraction than the second region, and wherein the first region, the second region, and the plurality of microreplicated posts together form a continuous layer;
   a substrate layer; and
   a sealing layer;
   wherein the sealing layer is optically coupled to a first major surface of the variable index light extraction layer; and wherein the substrate layer is optically coupled to a second major surface of the variable index light extraction layer, opposite the sealing layer.

10. The optical film of claim 9, wherein the sealing layer comprises an adhesive.

11. The optical film of claim 10, further comprising a blocking layer, wherein the blocking layer is disposed between the adhesive and the at least a portion of the plurality of microreplicated posts.

12. The optical film of claim 9, further comprising a lightguide optically coupled to the sealing layer.

13. The optical film of claim 9, further comprising a lightguide optically coupled to the substrate layer.

14. The optical film of claim 12, further comprising a reflective display panel configured to reflect light toward the variable index light extraction layer.

15. A method of forming a variable index light extraction layer, comprising:
   microreplicating a plurality of posts on a substrate; and
   selectively applying a substance within portions of an area between the posts;
   wherein a first region comprises at least a portion of the plurality of posts and portions of an area between the posts not filled by the substance;
   wherein a second region comprises portions of the area between the posts filled by the substance;
   wherein the first region has a lower effective index of refraction than the second region.

16. The method of claim 15, wherein the substance comprises an ink.

17. The method of claim 15, wherein the substance comprises an adhesive.

18. The method of claim 15, wherein microreplicating the plurality of posts on the substrate comprises using a cast and cure method.

19. The method of claim 15, wherein selectively applying the substance on the substrate comprises using an indirect gravure printing process.

20. A method of forming a variable index light extraction layer, comprising:
   microreplicating a plurality of posts on a substrate, forming a pattern comprising spaces between the posts;
   selectively forming a blocking layer on an adhesive of a sealing layer; and
   attaching the sealing layer to the substrate such that the blocking layer prevents penetration of the adhesive into one or more of the spaces between the posts;
   wherein a first region comprises one or more spaces between the posts without adhesive penetration; and
   wherein a second region comprises the spaces at least partially filled by the adhesive of the sealing layer.

* * * * *